(12) United States Patent  
Hachmann

(10) Patent No.: US 11,755,796 B2  
(45) Date of Patent: Sep. 12, 2023

(54) SYSTEM AND METHOD FOR TESTING THE TECHNICAL APPLICABILITY OF INTELLECTUAL PROPERTY RIGHTS

(71) Applicant: Erich Netzsch GmbH & Co. Holding KG, Selb (DE)

(72) Inventor: Thorsten Hachmann, Thierstein (DE)

(73) Assignee: Erich Netzsch GmbH & Co. Holding KG, Selb (DE)

( * ) Notice: Subject to any disclaimer, the term of this patent is extended or adjusted under 35 U.S.C. 154(b) by 366 days.

(21) Appl. No.: 17/327,986

(22) Filed: May 24, 2021

(65) Prior Publication Data

US 2021/0383044 A1 Dec. 9, 2021

(30) Foreign Application Priority Data

Jun. 8, 2020 (DE) ............ 10 2020 115 209.4

(51) Int. Cl.
*G06F 30/30* (2020.01)
*G06F 40/30* (2020.01)
(Continued)

(52) U.S. Cl.
CPC ............ *G06F 30/30* (2020.01); *G06F 16/367* (2019.01); *G06F 40/30* (2020.01); *G06F 40/42* (2020.01);
(Continued)

(58) Field of Classification Search
CPC ........ G06F 30/30; G06F 16/367; G06F 40/30; G06F 40/42; G06F 2119/02; G06F 2119/18; G06F 2113/10; G06F 30/10; G06F 30/12
See application file for complete search history.

(56) References Cited

U.S. PATENT DOCUMENTS 7,912,701 B1 * 3/2011 Gray ............... G06F 40/30
704/7
2006/0036632 A1 2/2006 Williams
(Continued)

*Primary Examiner* — Jack Chiang
*Assistant Examiner* — Brandon Bowers
(74) *Attorney, Agent, or Firm* — WHITMYER IP GROUP LLC

(57) ABSTRACT

A system for testing the technical applicability of intellectual property rights having a computational linguistics module, which is designed to receive chains of technical graphemes and/or digitized symbolic images of intellectual property right specifications as input information, and to mechanically transfer the input information into an information model, an ontology memory, which is designed to store taxonomies, which are linked via inference rules, of conceptual classified object types, a semiotics module, which is coupled to the computational linguistics module and the ontology memory and which is designed to instantiate semiotic signs included in the information model, which is generated by the computational linguistics module, using conceptual classified object types stored in the ontology memory, and to create a contextualized information model, a construction module, which is coupled to the semiotics module and which is designed to generate a CAD model from the contextualized information model created by the semiotics module, and a 3D printing device, which is coupled to the construction module and which is designed to additively manufacture a product, which is encoded by the CAD model.

17 Claims, 1 Drawing Sheet

(51) Int. Cl.
  *G06F 16/36* (2019.01)
  *G06F 40/42* (2020.01)
  *G06F 119/02* (2020.01)
  *G06F 119/18* (2020.01)

(52) U.S. Cl.
  CPC ...... *G06F 2119/02* (2020.01); *G06F 2119/18* (2020.01)

(56) References Cited

U.S. PATENT DOCUMENTS

| | | | |
|---|---|---|---|
| 2017/0360578 A1* | 12/2017 | Shin | G09B 23/286 |
| 2018/0129188 A1* | 5/2018 | Jacobs, II | G05B 19/4093 |
| 2018/0157665 A1 | 6/2018 | Lundberg et al. | |
| 2019/0073730 A1 | 3/2019 | Perkowski et al. | |

* cited by examiner

SYSTEM AND METHOD FOR TESTING THE TECHNICAL APPLICABILITY OF INTELLECTUAL PROPERTY RIGHTS

TECHNICAL FIELD

The invention relates to a system and a method for testing the technical applicability of intellectual property rights.

BACKGROUND

In practice, an evaluation of the commercial applicability and feasibility of contents of intellectual property rights, such as, for example, patent applications or patents, is difficult. Among other things, this is because the presentation of the information, which is relevant for the evaluation, is not standardized, complex connections exist between different and differently presented pieces of information, and the level of abstraction of the invention, which is relevant for the evaluation, is often quite high.

Different approaches from the prior art deal with the preparation of information from intellectual property applications and specifications: The publication US 2019/0073730 A1, for example, discloses methods for the systematic analysis of textual pieces of information in order to reveal complex technical connections. The publication US 2018/0157665 A1 discloses systems and methods for the computer-aided evaluation of patent portfolios. The publication US 2006/0036632 A1 discloses systems and methods for the evaluation of patents using artificial intelligence.

SUMMARY

One of the objects of the invention is to thus improve automated or semi-automated solutions for the visualization of technical concepts and ideas, which are found in intellectual property right applications and/or specifications.

These and other objects are solved by means of a system and method comprising the features of the claims.

According to a first aspect of the invention, a system for testing the technical applicability of intellectual property rights comprises a computational linguistics module, which is designed to receive chains of technical graphemes and/or digitized symbolic images of intellectual property right specifications as input information, and to mechanically transfer the input information into an information model, an ontology memory, which is designed to store taxonomies, which are linked via inference rules, of conceptual classified object types, a semiotics module, which is coupled to the computational linguistics module and the ontology memory and which is designed to instantiate semiotic signs included in the information model, which is generated by the computational linguistics module, using conceptual classified object types stored in the ontology memory, and to create a contextualized information model, a construction module, which is coupled to the semiotics module and which is designed to generate a CAD model from the contextualized information model created by the semiotics module, and a 3D printing device, which is coupled to the construction module and which is designed to additively manufacture a product, which is encoded by the CAD model.

According to a second aspect of the invention, a method for testing the technical applicability of intellectual property rights comprises the steps of capturing chains of technical graphemes and/or digitized symbolic images of intellectual property rights as input information, of mechanically computer linguistically transferring the captured input information into an information model, of instantiating semiotic signs included in the information model by means of conceptually classified object types of a taxonomy linked via inference rules, so that a contextualized information model is created, of generating a CAD model from the created contextualized information model, and of additively manufacturing a product, which is encoded by the CAD model, using a 3D printing device.

One of the essential ideas of the invention is to extract information relating to innovative concepts, which are included in patent claims or claims, in textual or tabular description of the innovative concepts and/or in drawings of the innovative concepts, using a software, to contextually prepare them, augmenting them to functional actual objects using reference information, and to create a digital manufacturing model therefrom. The digital manufacturing model, in turn, can then be used as basis for an additive manufacture of a prototype using 3D printing processes or as basis for a digital three-dimensional model in a visualization software.

A particular advantage of the solution according to the invention follows from the fact that a printed prototype represents a haptic and optical assessment aid, in order to be able to understand, how complex objects of an invention are constructed, what their functionality is, and whether the objects could also have access to a technical series manufacturing in a practical manner.

Advantageous designs and further developments follow from the further subclaims as well as from the description with reference to the figures.

According to some embodiments of the system, the 3D printing device can have a plant for the selective laser sintering, a plant for the selective laser melting, or a stereolithography plant.

According to some further embodiments of the system, the system can furthermore have a slicing module, which is coupled between the construction module and the 3D printing device and which is designed to image the CAD model onto a parquetted surface model via a layer decomposition algorithm.

According to some further embodiments of the system, the system can furthermore have an image capturing device, which is designed to capture the chains of technical graphemes and/or of digitized symbolic images of intellectual property right specifications as image information. The computational linguistics module can thereby have an OCR means, which is designed to carry out an automatic character recognition, in order to convert the captured image information of the image capturing device into the input information for the computational linguistics module.

According to some further embodiments of the system, the construction module can furthermore be designed to output the generated CAD model to a three-dimensional image manipulation software.

According to some further embodiments of the system, the computational linguistics module, the semiotics module, and the construction module can be software components, which are executed on a processor of an electronic data processing means.

According to some further embodiments of the system, the system can furthermore have an analysis memory, which is coupled to the computational linguistics module and which is designed to store morpheme lexica, parsing rules, predicate logics and/or models of discourse.

According to some embodiments of the method, the 3D printing device can have a plant for the selective laser sintering, a plant for the selective laser melting, or a stereolithography plant.

According to some further embodiments of the method, the method can furthermore have the step of imaging the CAD model onto a parquetted surface model via a layer decomposition algorithm, which uses the 3D printing device to additively manufacture the product.

According to some further embodiments of the method, predefined morpheme lexica, parsing rules, predicate logics and/or models of discourse can be resorted to when computationally linguistically transferring the input information into an information model.

According to some further embodiments of the method, the generated CAD model can furthermore be output to a three-dimensional image manipulation software.

Where it makes sense, the above designs and further developments can be arbitrarily combined with one another. Further possible designs, further developments, and implementations of the invention also comprise combinations, which are not mentioned explicitly, of the features of the invention mentioned above or below with respect to the exemplary embodiments. The person of skill in the art will thereby in particular also add individual aspects as improvements or additions to the respective basic form of the present invention.

BRIEF DESCRIPTION OF THE DRAWINGS

The present invention will be explained in more detail below on the basis of the exemplary embodiments specified in the schematic figures, in which.

DETAILED DESCRIPTION

Figure 1:
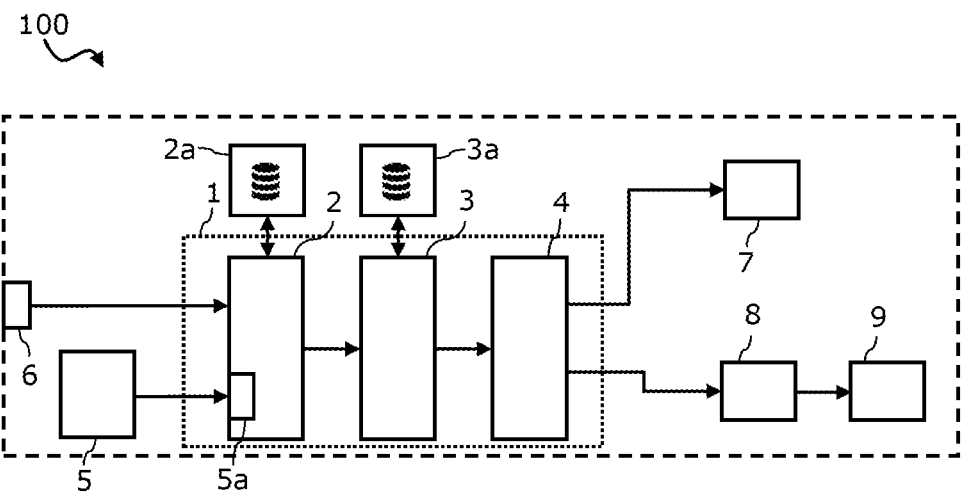
FIG. 1 shows a schematic block diagram of the construction of a system for testing the technical applicability of intellectual property rights according to an embodiment of the invention.

The enclosed figures are to provide a further understanding of the embodiments of the invention. They illustrate embodiments and, in connection with the description, they serve to explain principles and concepts of the invention. Other embodiments and many of the mentioned advantages follow with regard to the drawings. The elements of the drawings are not necessarily shown to scale with respect to one another. Directional terminology, such as, for example, "top", "bottom", "left", "right", "above", "below", "horizontally", "vertically", "front", "rear", and similar information is only used for illustrative purposes, and does not serve to limit the generality to specific designs as shown in the figures.

Elements, features and components, which are identical, functionally identical, and which have identical effects, are in each case provided with the same reference numerals in the figures of the drawing, unless otherwise specified. 3D printing processes in terms of the present application comprise all generative manufacturing processes, in the case of which objects of a predefined form are produced on the basis of geometric models from formless materials, such as liquids and powders, or form-neutral semi-finished products, such as, for instance, strip-shaped, wire-shaped, or web-shaped materials, by means of chemical and/or physical processes in a specific generative manufacturing system. 3D printing processes in terms of the present application thereby use additive processes, in the case of which the starting material is built up sequentially in layers in specified forms. 3D printing processes thereby comprise in particular stereolithography (SLA), selective laser sintering (SLS), and selective laser melting (SLM). 3D printing processes in terms of the present invention in particular comprise additive manufacturing processes, in the case of which metallic starting materials, such as, for example, liquefied plastic, plastic powder, liquefied metal, or metal powder, are used for the generative manufacture of components.

In the case of 3D printing processes, data sets, which are used in a specific generative manufacturing system for the production of real objects corresponding to the data sets, are created on the basis of geometric models. 3D printing processes are currently widely used in the production of prototypes or in the rapid product development (RPD), in which a resource-efficient process chain is used for the demand-oriented small and high-volume manufacture of individualized components. 3D printing processes are used for a variety of applications in civil engineering, in architecture, in the dental technology, in mechanical engineering, in the implantology, in the industrial design, as well as in the automobile industry and transportation industry in general.

3D printers and specifically laser sintering devices use a computer-aided design (CAD) system on the one hand, and a blasting plant on the other hand, which carries out the generative layer construction of the object to be printed on the basis of the digital manufacturing model provided by the CAD system. A three-dimensional CAD model of the object to be printed is thereby subjected to a preparation procedure, the so-called "slicing", which is carried out to generate the control data necessary for the blasting plant. The CAD model is thereby digitally decomposed into layers of specified even thickness with layer normal along the construction direction of the blasting plant, which then form the basis for controlling the energy beam at the starting material surface in the blasting plant. A conventional layer decomposition algorithm thereby images the CAD model onto a parquetted surface model, whereby a quantity of closed curves or surface polygons, respectively, are created, which define the so-called "slices" between two model cuts, which are perpendicularly consecutive through construction direction of the blasting plant.

Such surface models can be stored, for example, in the STL format, which is common for the stereolithography and which describes the surface geometry of the three-dimensional object to be printed as raw data of unstructured triangular structures. The blasting plant imports the surface model data and converts it into a corresponding control pattern for the processing beam in a SLA, SLS, or SLM manufacturing process.

Such a blasting plant can be, for example, a 3D printing device, in particular for instance a plant for the selective laser sintering, a plant for the selective laser melting, or a stereolithography plant. An exemplary production procedure will be explained below in general in connection with SLS—the principles apply analogously for other manufacturing processes.

An energy source, for example a laser, sends an energy beam in a location-selective manner to a certain portion of a powder surface of powdery material, which rests on a work platform in a work chamber. For this purpose, an optical deflecting device or scanner module, respectively, such as, for instance, a movable or tiltable mirror, respectively, which deflects the energy beam depending on its tilt position to a certain portion of the powder surface of the powder.

The powder is heated at the point of impact of the energy beam, so that the powder particles are melted locally and form an agglomerate in response to a cool-down. As a function of a digital manufacturing model, which is provided and optionally prepared by means of a CAD system, the energy beam scans the powder surface, or the work platform is moved underneath the stationary energy beam. After the selective melting and local agglomerating of the powder particles in the surface layer of the powder, excess, non-agglomerated powder can be transferred into an excess container. The work platform is then lowered and new powder from a powder reservoir is transferred into the work chamber by means of a reservoir platform using help of a levelling roller or another suitable doctor blade or rolling means.

A three-dimensionally sintered or "printed" object, respectively, of agglomerated powder is created in this way in an iterative generative construction process. The surrounding powder thereby serves to support the portion of the object constructed by then, so that an external support structure is not necessary. Due to the continuous downwards movement of the work platform, the object B is created in layer-wise model creation. The object can be, for example, a component, which has technical elements and components, as they are explained and described in a technical description and/or graphic representation of an intellectual property right application or of an intellectual property right specification.

It is desirable for this purpose that an automated or semi-automated generation of a surface model for the 3D printing device takes place from a CAD model, which, in turn, can be obtained in an automated or semi-automated manner from a contextualized description model of the essential contents of an intellectual property right application or of an intellectual property right specification.

FIG. 1 shows a schematic block diagram of a system 100 for testing the technical applicability of intellectual property rights, for example of patent applications, patents and/or utility models. Among other things, the system 100 can also be used to carry out a method M for testing the technical applicability of intellectual property rights, as will be described further below in connection with FIG. 2.

As central elements, the system 100 comprises a computational linguistics module 2, a semiotics module 3 comprising a connected ontology memory 3*a*, as well as a construction module 4. The computational linguistics module 2, the semiotics module 3, and the construction module 4 can be, for example, software components, which are executed on a processor 1 of an electronic data processing means. In the alternative, it can also be possible that the computational linguistics module 2, the semiotics module 3, and the construction module 4 are each implemented in separate hardware components.

Intellectual property right specifications, such as, for example, published patent applications, patent specifications, or utility model specifications can be imported via an input interface 6 into the computational linguistics module 2 together with metadata. In most property right registers, this data is present with sufficient quality and so as to be retrievable in an automated manner, so that the necessary information is already available to the computational linguistics module 2 in electronic and digitized form.

In the alternative, intellectual property specifications can be captured as image information via an image capturing device 5, such as, for instance, a camera or another imaging sensor. The image capturing device 5 is coupled to the computational linguistics module 2 via an OCR means 5*a*, which is implemented in the computational linguistics module 2 and which can carry out an automatic character recognition ("optical character recognition", OCR), in order to convert the captured image information of the image capturing device 5 into digital information, which can be processed by the computational linguistics module 2.

The computational linguistics module 2 can mechanically transfer chains of technical graphemes and/or of digitized symbolic images of intellectual property right specifications into an information model. For this purpose, the computational linguistics module 2 can access an analysis memory 2*a*, which is coupled to the computational linguistics module 2. Different inference and interdependence rules, which serve as configuration data for the analysis tools of the computational linguistics module 2, can be stored in the analysis memory 2*a*. For example, morpheme lexica, parsing rules, predicate logics and/or models of discourse can be stored in the analysis memory 2*a*.

To image written or symbolically illustrated amounts of information on interpretation data, which is annotated according to meaning, the computational linguistics module 2 can include several processing planes. Each of these processing planes of the computational linguistics module 2 can thereby correspond to a hierarchically constructed filter module, which generates a systematically prepared representation as input quantity, which is to be further processed, for a subsequent filter module. It should be clear thereby that these filter modules do not necessarily have to be realized in a sequential architecture, the run sequence of which is specified unambiguously.

Technical graphemes are minimally distinctive and script-systemically contextualized script units, which make it possible in the first place to differentiate two concepts. Technical graphemes can be grouped into grapheme clusters, i.e. sequentially segmentable text units on individual graphemes, which are combined with zero-width markers and other formatting characters. Technical graphemes can comprise in particular electronically encoded glyphs, zero-width or non-zero-width marking symbols, splice symbols and delimiters, graphic characters, letters, combined markers, alphanumeric symbols, punctuation characters, and spaces.

Digitized symbolic images are schematic illustrations of technical facts and concepts, which are provided with reference numerals and which have a certain level of simplification and abstraction compared to actual objects. It is necessary thereby to be able to differentiate in the image itself between metadata, such as reference numerals on the one hand, and concept data on the other hand. Digitized symbolic images can include realistic perspective and scale-preserving illustrations or functionalized diagrammatic diagrams.

The processing planes of the computational linguistics module 2 can have, for example, a graphemic normalization plane as input plane, on which chains of technical graphemes are imaged on strings of characters, which are pre-defined as concepts in taxonomies. For example, abbreviations are expanded on the graphemic normalization plane, punctuation characters are separated from word forms, hyphenations and zero-width formatting markers are recognized as such, and mathematical symbols are put into writing. Majuscules and minuscules can likewise be separated from one another.

After the graphemic normalization, also referred to as tokenization, a morphological processing takes place in the computational linguistics module 2, in the case of which the morphemes, which are relevant for the meaning and syntactic function of a word, are isolated from the normalized graphemes by using morpheme lexica, which are linked by means of morphotactic rules. Different types of morpheme connections can be considered thereby, such as, for example, derivation, composition, or inflection. A morphological processing can take place, for example, via dual finite automatic units—the output of a morphological analysis can be a syntactically annotated word form chain, which is augmented with parameters, such as, for instance, word classes, verb valences, adjective valences, and information about number, tense, gender, and case.

After the morphological processing, the computational linguistics module 2 can carry out a parsing, i.e. a syntactic analysis, in order to find out which words and parts of a sentence correspond semantically. Syntactic analyses can take place via syntactic components, which divide sentences into their components and identify the functions thereof. A semantic analysis furthermore takes place in the computational linguistics module 2 via a semantic component, which can output representations of word meanings. Semantic processing requires a determination of possible argument fields for operators, such as negations, modal operators, or quantifiers. The representation of meaning of the sentence is output by means of the semantic component, mostly in formal representation, such as, for instance, in the form of a predicate logic. The computational linguistics module 2 can then carry out a semantic evaluation, i.e. a sentence interpretation of syntactically annotated sentences, via the representation of meaning, for example by resorting to models of discourse, which can be stored in the analysis memory 2a.

A semiotics module 3, which is coupled to the computational linguistics module 2, serves to instantiate semiotic signs in the information model, which is generated by the computational linguistics module 2. This instantiation serves to create a contextualized information model by means of the semiotics module 3. In the case of a semiotic analysis, the object is to assign the correct object to a sign, which imparts knowledge about an object, thus to establish a link between the sign and the object via a mental concept of the object, the so-called interpretants of the sign.

The semiotics module 3 can thereby resort to an ontology memory 3a, in which taxonomies of conceptually classified object types are stored, which are linked via inference rules. The semiotic module 3 creates a contextualized information model, i.e. a syntactically and morphologically analyzed model of the input information, in which certain signs are semiotically instantiated with objects of certain object types.

The semiotics module 3 transfers the contextualized information model to a construction module 4. This construction module 4 can generate a CAD model from the contextualized information model, in which the instantiated objects are functionally and structurally coupled to one another and are spatially arranged according to the syntactic and morphological analysis data included in the information model as metadata. On the one hand, the CAD model can then be submitted to a 3D printing device 9—such as, for instance, a plant for the selective laser sintering, a plant for the selective laser melting, or a stereolithography plant—in order to additive manufacture a product, which is encoded by the CAD model.

So that the 3D printing device 9 can process the CAD model, it can be possible to couple a slicing module 8 between the construction module 4 and the 3D printing device 9, in order to image the CAD model via suitable layer decomposition algorithms on a parquetted surface model, which is evaluated by the 3D printing device 9 in response to the additive manufacturing procedure.

On the other hand, the CAD model can also be output to a three-dimensional image manipulation software or visualization software 7, in order to get a more detailed optical impression of the product to be manufactured by means of digital image manipulation.

Figure 2:
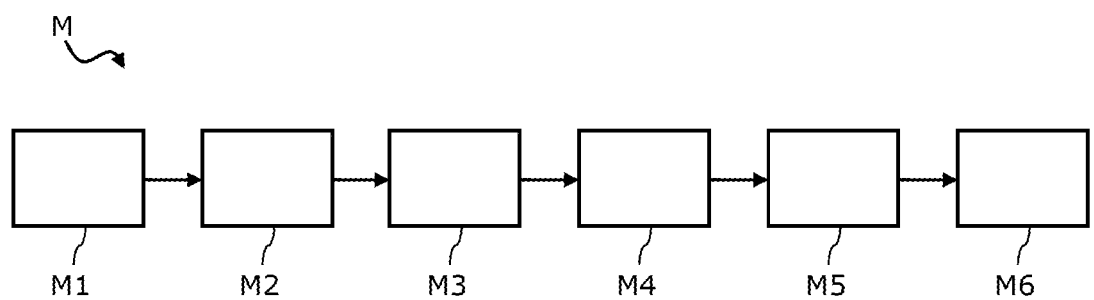
FIG. 2 shows a flowchart of a method for testing the technical applicability of intellectual property rights according to a further embodiment of the invention.

FIG. 2 shows a flowchart of method steps of a method M for testing the technical applicability of intellectual property rights, for example of patent applications, patents, and/or utility models. The method M can be carried out in particular by using a system 100 for testing the technical applicability of intellectual property rights, as described in connection with FIG. 1.

A capturing of chains of technical graphemes and/or of digitized symbolic images of intellectual property right specifications as input information takes place in a first step M1. This input information is mechanically transferred into an information model by using computational linguistic algorithms in a second step M2. For example, predefined morpheme lexica, parsing rules, predicate logics and/or models of discourse can be resorted to for this purpose, in order to be able to carry out a computational linguistic analysis of the input information.

An instantiation of semiotic signs included in the information model by means of conceptualized classified object types of a taxonomy linked via inference rules then takes place in a third step M3. A contextualized information model can be created in this way, which serves as basis for the generation of a CAD model in a fourth step M4. In a fifth step M5, the CAD model can optionally be imaged via a layer decomposition algorithms on a parquetted surface model, which uses the 3D printing device 9 in order to additively manufacture a product, which is encoded by the CAD model in a sixth step M6. The 3D printing device 9 can be, for example, a plant for the selective laser sintering, a plant for the selective laser melting, or a stereolithography plant.

Parallel to the 3D printing, the generated CAD model can also be viewed and/or changed by means of a three-dimensional image manipulation software 7.

Different features for improving the stringency of the illustration have been combined in one or several examples in the preceding detailed description. It should be clear thereby, however, that the above description is only of an illustrative, but in no way of a limiting nature. It serves to cover all alternatives, modifications, and equivalents of the different features and exemplary embodiments. Many other examples will be immediately and directly clear to the person of skill in the art on the basis of his expert knowledge in consideration of the above description.

The exemplary embodiments were selected and described in order to be able to describe the principles on which the invention is based, and the possible uses thereof in practice in the best possible way. Experts can thus optimally modify and use the invention and its different exemplary embodiments with regard to the intended purpose. In the claims as well as in the description, the terms "including" and "having" are used as concepts in neutral language for the corresponding terms "comprising". A use of the terms "a" and "an" is to furthermore not generally exclude a plurality of features and components described in this way.

The invention claimed is:

1. A system for testing the technical applicability of intellectual property rights comprising:
 a computational linguistics module, which is designed to receive chains of technical graphemes and/or digitized symbolic images of intellectual property right specifications as input information, and to mechanically transfer the input information into an information model;

an ontology memory, which is designed to store taxonomies, which are linked via inference rules, of conceptual classified object types;

a semiotics module, which is coupled to the computational linguistics module and the ontology memory and which is designed to instantiate semiotic signs included in the information model, which is generated by the computational linguistics module, using conceptual classified object types stored in the ontology memory, and to create a contextualized information model;

a construction module, which is coupled to the semiotics module and which is designed to generate a CAD model from the contextualized information model created by the semiotics module; and a 3D printing device, which is coupled to the construction module and which is designed to additively manufacture a product, which is encoded by the CAD model.

2. The system according to claim 1, wherein the 3D printing device has a plant for the selective laser sintering, a plant for the selective laser melting, or a stereolithography plant.

3. The system according to claim 2, furthermore comprising:

a slicing module, which is coupled between the construction module and the 3D printing device and which is designed to image the CAD model onto a parquetted surface model via a layer decomposition algorithm.

4. The system according to claim 2, furthermore comprising:

an image capturing device, which is designed to capture the chains of technical graphemes and/or of digitized symbolic images of intellectual property right specifications as image information, wherein the computational linguistics module has an OCR means, which is designed to carry out an automatic character recognition, in order to convert the captured image information of the image capturing device into the input information for the computational linguistics module.

5. The system according to claim 2, wherein the construction module is furthermore designed to output the generated CAD model to a three-dimensional image manipulation software.

6. The system according to claim 2, wherein the computational linguistics module, the semiotics module, and the construction module are software components, which are executed on a processor of an electronic data processing means.

7. The system according to claim 1, furthermore comprising:

a slicing module, which is coupled between the construction module and the 3D printing device and which is designed to image the CAD model onto a parquetted surface model via a layer decomposition algorithm.

8. The system according to claim 1,
furthermore comprising:

an image capturing device, which is designed to capture the chains of technical graphemes and/or of digitized symbolic images of intellectual property right specifications as image information, wherein the computational linguistics module has an OCR means, which is designed to carry out an automatic character recognition, in order to convert the captured image information of the image capturing device into the input information for the computational linguistics module.

9. The system according to claim 1, wherein the construction module is furthermore designed to output the generated CAD model to a three-dimensional image manipulation software.

10. The system according to claim 1, wherein the computational linguistics module, the semiotics module, and the construction module are software components, which are executed on a processor of an electronic data processing means.

11. The system according to claim 1, furthermore comprising:

an analysis memory, which is coupled to the computational linguistics module and which is designed to store morpheme lexica, parsing rules, predicate logics and/or models of discourse.

12. A method for analyzing the technical applicability of intellectual property rights, comprising:

capturing chains of technical graphemes and/or digitized symbolic images of intellectual property rights as input information;

computer linguistically transferring the captured input information into an information model;

instantiating semiotic signs included in the information model by means of conceptually classified object types of a taxonomy linked via inference rules, so that a contextualized information model is created;

generating a CAD model from the created contextualized information model; and additively manufacturing a product, which is encoded by the CAD model, using a 3D printing device.

13. The method according to claim 12, wherein the 3D printing device has a plant for the selective laser sintering, a plant for the selective laser melting, or a stereolithography plant.

14. The method according to claim 12, furthermore comprising:

imaging the CAD model onto a parquetted surface model via a layer decomposition algorithm, which uses the 3D printing device to additively manufacture the product.

15. The method according to claim 12, wherein predefined morpheme lexica, parsing rules, predicate logics and/or models of discourse are resorted to when computationally linguistically transferring the input information into an information model.

16. The method according to claim 12, wherein the generated CAD model is furthermore output to a three-dimensional image manipulation software.

17. The method according to claim 13, furthermore comprising:

imaging the CAD model onto a parquetted surface model via a layer decomposition algorithm, which uses the 3D printing device to additively manufacture the product.

* * * * *